PHOTOSENSITIVE AUTOMATIC CONTRAST CONTROL FOR FACSIMILE

Filed May 31, 1962

INVENTOR
GERALD G. MURPHY
BY Edward P. Connors
ATTORNEY

United States Patent Office 3,153,726
Patented Oct. 20, 1964

3,153,726
PHOTOSENSITIVE AUTOMATIC CONTRAST CONTROL FOR FACSIMILE

Gerald G. Murphy, Clifton, N.J., assignor to Hogan Faximile Corporation, New York, N.Y.

Filed May 31, 1962, Ser. No. 199,108
9 Claims. (Cl. 250—207)

The present invention relates to facsimile transmitting systems, and more particularly to automatic means for maintaining contrast control of the recorded copy irrespective of variations in shade of the background of subject copy.

In the art of facsimile transmission and reception of graphic material such as printed matter or pictures the subject copy is moved past an illuminated scanning line and a reflected image of the line is scanned sequentially to produce an analogue type electric video signal. These electric signals are transmitted to a remote point by radio or wire and after proper amplification are used to actuate a recorder to produce marks on the recording sheet corresponding to the subject copy.

At the recorder the graphic information usually is reproduced as black marks on a white background. Generally, it has been assumed that in a good facsimile system the recorded copy should correspond exactly in density to the subject copy. However, if the original copy has a colored background, the recording may have a grayish cast and thus the graphic information has less contrast with respect to the background. For this reason it is preferable that the recording have a white background even though the original is colored. It is also preferable that light marks, such as pencil marks on the original, stand out on the recording so as to provide greater contrast with the background. A control for adjustment of the recorded background density may be used to provide the desired contrast.

Heretofore constructions have been provided for automatic control of the background in which the output level of the amplifier for the photomultiplier tube has been raised by adjustment of the power applied to the light source used to illuminate the scanning line. Such constructions have not been wholly satisfactory because variations in the light intensity by adjustment of the power applied to the light source has resulted in marked changes in the spectral content of the light output. This is disadvantageous in that the photomultiplier tube is more responsive in certain spectral regions than in others, and the variations in the power applied to the light source may provide a light output outwardly of the spectral region in which the photomultiplier tube is the most sensitive. Thus the compensation for the variations in background by a variation in the output of the light source may not produce the desired variation in the electric signal unless other compensating means are employed.

The present invention aims to overcome the difficulties and disadvantages of prior devices by compensating for variations in the optical density of the background by varying the sensitivity of the photomultiplier tube while maintaining the scanning light output constant.

In accordance with the invention this is accomplished by sensing the amplified output of the photomultiplier tube to control a gated amplifier producing a pulsed output which is stepped up in voltage and rectified to form a direct current control potential applied in series with the power supply for the photomultiplier tube.

In a typical facsimile transmitter system the circuitry is so arranged that the white level represents minimum information and corresponds to maximum current in the photomultiplier tube output. An inverter is used so that the white level maximum output signal of the photomultiplier tube is changed to effect minimum output from the photomultiplier tube amplifier. Accordingly printing, pencil marks, or other black marks cause an increase in the photomultiplier tube amplifier output. Thus an increase in the background optical density as because of tinting or shading of the background likewise results in an increase in the photomultiplier tube amplifier output and a decrease in the relative amplitude of the information signal above the background. By increasing the sensitivity of the photomultiplier tube the output of its amplifier is increased and there is an increase in the relative amplitude of the information signal above the background.

Another object of the invention is to provide an automatically controllable power supply for a photomultiplier tube.

Other objects and advantages of the invention will be apparent from the following description and from the accompanying drawings which show, by way of example, an embodiment of the invention.

Figure 1:
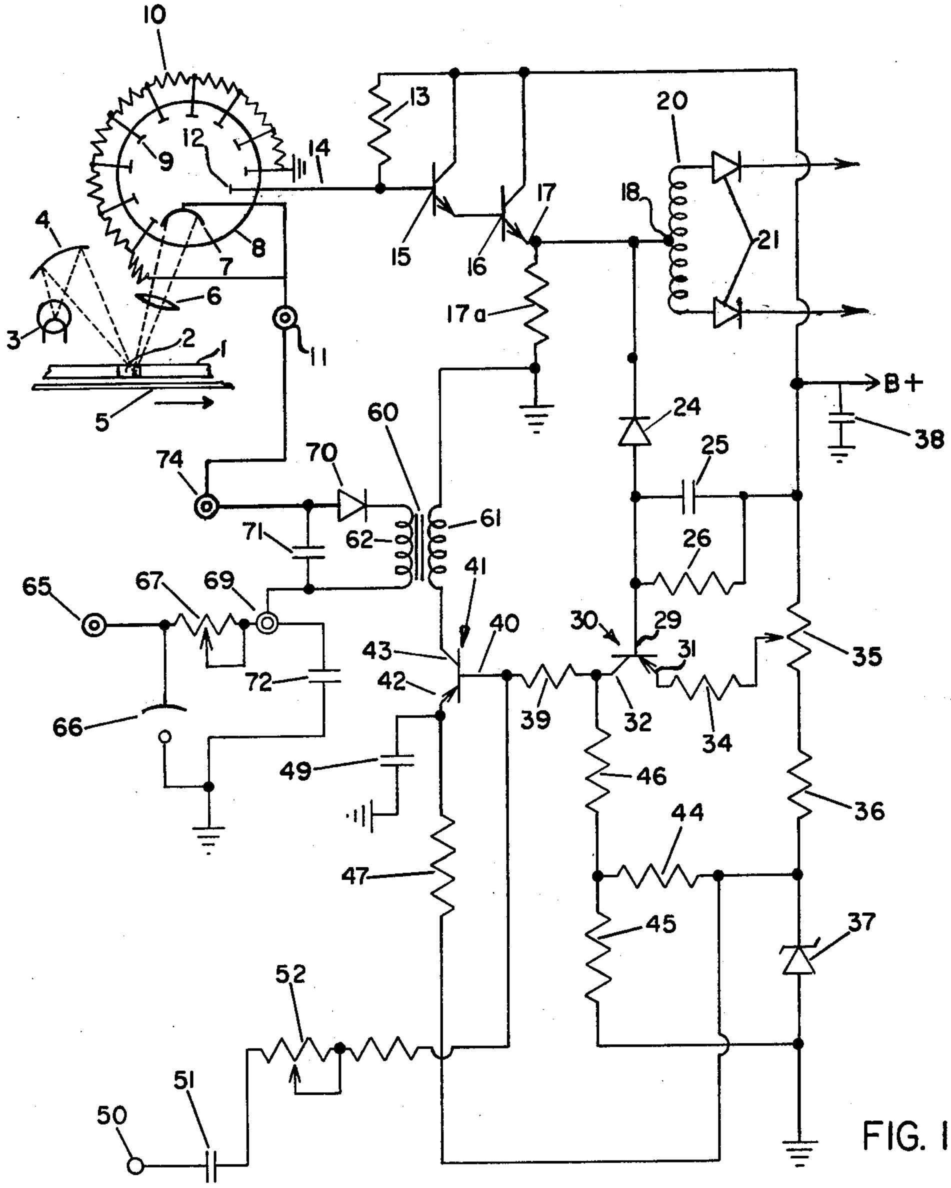
FIGURE 1 is a schematic drawing of a system in accordance with the invention.

Referring to the drawings there is shown in FIGURE 1 a portion of a facsimile transmitter including a scanning plate 1 having a scanning slot 2 therein. A scanning lamp 3 is positioned to one side of a reflector 4 so as to direct the light along the length of the scanning slot 2 and against the surface of subject copy 5 which is passed beneath the scanning plate 1. Light reflected from the subject copy 5 is collected by a suitable lens system 6 and directed to cathode 7 of photomultiplier tube 8.

The photomultiplier tube 8 includes dynodes 9 connected by resistors 10 as is well known in the art. A supply voltage is applied to the photomultiplier tube 8 at its terminal 11. As will be hereinafter seen the sensitivity of the photomultiplier tube 8 may be varied within limits by adjustment of the supply voltage.

The output signal at anode 12 of the photomultiplier tube 8 is passed through line 14 to transistors 15 and 16 connected in cascade as emitter followers providing a low impedance driver stage. A direct current feed resistor 13 is connected to the anode 12. Output 17 of the driver stage is connected through a resistor 17*a* to ground. The output 17 is connected to video driving point 18 of a secondary winding 20 of a modulating transformer feeding modulating diodes 21, the output of the modulating diodes being connected in a suitable circuit for effecting modulation of a carrier for transmission to the receiver as is well known in the art.

The amplified video signal is sensed at the output 17 of the driver stage and rectified in a diode 24 to charge a time constant circuit including a capacitor 25 and a resistor 26 connected in parallel. The impedance of the charging circuit for the capacitor 25 is considerably lower than the impedance of its discharge circuit.

The potential of the capacitor 25 is applied to base 29 of a control transistor 30, also having an emitter 31 and a collector 32. An emitter swamping resistor 34 is connected to the tap of a potentiometer 35 which sets the bias for the control transistor 30. The potentiometer 35 is connected from the B+ supply through a resistor 36 and a zener diode 37 to ground to form a reference power supply across the zener diode 37. A supply by-pass capacitor 38 is connected to ground at main supply terminal B+.

The collector 32 of control transistor 30 is connected through an isolating resistor 39 to base 40 of a gated amplifier transistor 41 also having an emitter 42 and a collector 43. The isolating resistor enables the driving of the gated amplifier transistor 41 without excessive loss of signal to the control transistor 30. A voltage divider including resistors 44 and 45 is connected across the zener diode 37 to apply a potential through collector load resistor 46 to the collector 32 of the control transistor 30 to provide the desired direct current operating point. From one side of the zener diode 37 a potential is applied through emitter swamping resistor 47 to the emitter 42 of the gated amplifier transistor 41, a bypass capacitor 49 being connected between emitter 42 and ground. The bypass capacitor 49 is employed to increase the effective gain of the gated amplifier transistor 41.

Input terminal 50 is supplied by an alternating current driving potential, conveniently, the oscillator used to provide the carrier for the modulator. From input terminal 50 the alternating current driving potential is passed through a coupling capacitor 51 and a level adjusting series rheostat 52 to the base 40 of the gated amplifier transistor 41.

Thus, at the base of the gated amplifier transistor 41, is applied the alternating current driving signal from the input terminal 50, together with the direct current gating potential sensed by the diode 24 and amplified in the control transistor 30. At the collector load of the gated amplifier transistor 41 there is a pulsed output at the cyclical rate of the driving potential, varied in amplitude according to information obtained from the sensing diode 24.

Figure 2:
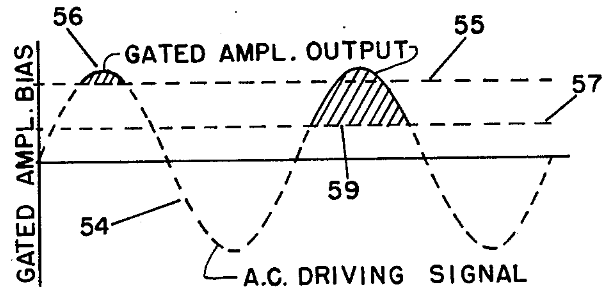
FIGURE 2 is a graph illustrating the controlled output of the gated amplifier.

The action of the gated amplifier is shown in FIGURE 2. Alternating current driving signal 54 from the input terminal 50 may be gated at level 55 to provide a small output indicated by the solid portion 56 of curve 54. In the event a larger output is required to compensate for a colored or tinted background, the gated amplifier 41 is operated at a bias such as level 57 to provide solid portion 59 of the curve 54. Levels 55 and 57 are typical control levels on the base 40 of the gated amplifier 41 effected by the control transistor 30.

A transformer 60 having a primary winding 61 and a secondary winding 62 is provided, its primary winding 61 being connected in series between the collector 43 of the gated amplifier transistor 41 and ground. A high voltage direct current supply is provided at input terminal 65, controlled by a corona regulator tube 66, and applied through a series level adjusting rheostat 67 to terminal 69. In the event no corrective potential were to be applied, the terminal 69 would be the power supply terminal for the photomultiplier tube 8.

The pulsed output of the gated amplifier 41 is stepped up in voltage in the transformer 60, its secondary winding 62 being connected in series with a second diode rectifier 70. A filtering capacitor 71 is connected across the output of the rectifier 70 and a bypass capacitor 72 is connected from the terminal 69 to ground.

The output of the rectifier 70 is connected in series with the power supply at the terminal 69 so that the voltage may be automatically varied at terminal 74 to vary the sensitivity of the photomultiplier tube 8.

Peak detection is accomplished by use of the diode detector 24 connected in series with capacitor 25 and resistor 26 connected in a time constant circuit. In the event the capacitor 25 and the resistor 26 are connected in parallel, and the time constant of this R-C combination is long compared to the charging time of capacitor 25 through the diode 24 due to the low impedance of the driver stage including transistors 15 and 16, the potential developed in the R-C circuit is substantially the peak value of the video signal.

In the operation of the system copy 5 is inserted under the scanning plate 1, the copy being moved past the scanning slot 2. Light from the source 3 is reflected from the surface of the copy 5 and collected by the suitable lens system 6 to be focussed on the cathode 7 of the photomultiplier tube 8. The output of the photomultiplier tube 8 is applied to the transistor 15 which is normally biased into conduction, the bias being opposed by the photomultiplier tube current, so that the output of the cascade connected transistors 15 and 16 is increased when light is received from black elemental areas of the copy. The output of the transistor 16 is applied to the secondary winding 20 of the modulator at its midpoint 18. The operation of the modulator is well known in the art, the video signal current driving the modulator to produce an amplitude modulated carrier output.

As stated before, if the original has a colored background, an uncompensated recording may have a grayish cast and thus the graphic information may have less contrast with respect to the background. For this reason it is preferable that the recording have a white background even though the original is colored.

In accordance with the invention a facsimile transmitting system is provided in which automatic contrast or background control is provided. In the operation of the automatic control a portion of the output of the transistor 16 is applied to the diode 24 to charge the time constant circuit including the capacitor 25 and the resistor 26 connected in parallel. The potential of the output of the transistor 16 will be lower when white elemental areas are being scanned.

Inasmuch as the capacitor 25, resistor 26 and diode 24 essentially form a peak voltmeter the capacitor 25 will be charged to the peak of the white signal which is actually minimum output of the cascade connected transistors 15 and 17. The charge on the capacitor 25 depends upon the whiteness of the copy, that is, a white background results in a higher charge on the capacitor 25 than a colored background.

The charge on the capacitor 25 tends to swing the base 29 of the control transistor 30 in the negative direction for conduction so that a controlled negative potential is applied to the base of the gated amplifier transistor 41 together with the alternating potential of the oscillator into the input 50. The pulsed output of the transistor 41 is stepped up in voltage in the transformer 60 and rectified in the diode 70 and applied in series with the high voltage supply provided at the input 65. The photomultiplier tube 8 is increased in sensitivity by an increase in its voltage and thus the background of the recorded copy is white even though the original is colored.

A facsimile transmitting system manufactured commercially and found to operate in a satisfactory manner employed constants for the electric components as follows:

| | |
|---|---|
| Photomultiplier tube 8 | Type RCA 6199. |
| Resistor 13 | 330K ohms. |
| Transistors 15, 16 | TI494. |
| Resistor 17*a* | 4700 ohms. |
| Modulating transformer 20 | Stancor TA 28. |
| Diodes 21, 24 | IN 625. |
| Capacitance 25 | 50 mfd. |
| Resistor 26 | 220K ohms. |
| Transistor 30 | Raytheon 2N1034. |
| Resistor 34 | 470 ohms. |

| | |
|---|---|
| Potentiometer 35 | 250 ohms. |
| Resistor 36 | 47 ohms. |
| Zener diode 37 | Motorola 1M14Z. |
| Capacitor 38 | 500 mfd. |
| Resistor 39 | 680 ohms. |
| Transistor 41 | Motorola 2N651. |
| Resistor 44 | 1K ohm. |
| Resistor 45 | 10K ohms. |
| Resistor 46 | 2.7K ohms. |
| Resistor 47 | 100 ohms. |
| Capacitor 49 | 25 mfd. |
| Capacitor 51 | .5 mfd. |
| Rheostat 52 | 25K ohms. |
| Transformer 60 | Stancor TA 47. |
| Regulator tube 66 | Victoreen GV3A-1200. |
| Rheostat 67 | 2.5 megohms. |
| Diode 70 | IN443B. |
| Capacitor 71 | 2 mfd. |
| Capacitor 72 | .06 mfd. |

While the invention has been described with reference to a specific embodiment thereof, it will be understood that other embodiments may be resorted to without departing from the invention. Therefore, the form of the invention set out above should be considered as illustrative and not as limiting the scope of the following claims.

I claim:

1. A facsimile transmitting system including automatic contrast control comprising a photomultiplier tube for generating video signals representative of the optical density of the copy, an output circuit for the photomultiplier tube including a driver stage, a detector coupled to the driver stage output, a time constant circuit supplied by the detector, a voltage supply for the photomultiplier tube, a gated amplifier, an alternating current source to drive the gated amplifier to produce a pulsed output, the gated amplifier being controlled by the time constant circuit, a step-up transformer having a primary and a secondary winding, the primary winding being connected in series with the gated amplifier, a rectifier connected in series with the secondary winding of the transformer, the rectifier output connected in series with the voltage supply for the photomultiplier tube, whereby the sensitivity of the photomultiplier tube is automatically controlled to effect a controlled video signal output.

2. A facsimile transmitting system including automatic contrast control comprising a photomultiplier tube for generating video signals representative of the optical density of the copy, an output circuit for the photomultiplier tube including a driver stage, a detector coupled to the driver stage output, a time constant circuit supplied by the detector including a resistance and a capacitance connected in parallel, a voltage supply for the photomultiplier tube, a gated amplifier, an alternating current source to drive the gated amplifier, the gated amplifier being controlled by the time constant circuit, a step-up transformer having a primary and a secondary winding, the primary winding being connected in series with the gated amplifier, a rectifier connected in series with the secondary winding of the transformer, the rectifier output connected in series with the voltage supply for the photomultiplier tube, whereby the sensitivity of the photomultiplier tube is automatically controlled to effect a controlled video signal output.

3. A facsimile transmitting system including automatic contrast control comprising a photomultiplier tube for generating video signals representative of the optical density of the copy, an output circuit for the photomultiplier tube including a driver stage, an isolating resistance, a time constant circuit connected through the isolating resistance to the driver stage output, said time constant circuit including a resistance and a capacitance connected in parallel, a voltage supply for the photomultiplier tube, a gated amplifier, an alternating current source to drive the gated amplifier to produce a pulsed output, the gated amplifier being controlled by the time constant circuit, a step-up transformer having a primary and a secondary winding, the primary winding being connected in series with the gated amplifier, a rectifier connected in series with the secondary winding of the transformer, the rectifier output connected in series with the voltage supply for the photomultiplier tube, whereby the sensitivity of the photomultiplier tube is automatically controlled to effect a controlled video signal output.

4. A facsimile transmitting system including automatic contrast control comprising, a photomultiplier tube for generating video signals representative of the optical density of the copy, an output circuit for the photomultiplier tube including a driver stage, a detector coupled to the driver stage output, a time constant circuit supplied by the detector, a voltage supply for the photomultiplier tube, a gated amplifier transistor having a base an emitter and a collector, an alternating current source to drive the base of the gated amplifier to produce a pulsed output, the time constant circuit connected to the base of the gated amplifier transistor for the control thereof, a step-up transformer having a primary and a secondary winding, the primary winding being connected in the collector circuit of the gated amplifier, a rectifier connected in series with the secondary winding of the transformer, the rectifier output connected in series with the voltage supply for the photomultiplier tube, whereby the sensitivity of the photomultiplier tube is automatically controlled to effect a controlled video signal output.

5. A facsimile transmitting system including automatic contrast control comprising a photomultiplier tube for generating video signals representative of the optical density of the copy, an output circuit for the photomultiplier tube including a driver stage, a diode detector coupled to the driver stage output, a time constant circuit supplied by the diode detector, a high voltage supply for the photomultiplier tube, an alternating current source, a gated amplifier transistor having a base an emitter and a collector, the alternating current source driving the base of the gated amplifier producing a pulsed output, the time constant circuit connected to the base of the gated amplifier transistor controlling the amplitude of the pulsed output, a step-up transformer having a primary and a secondary winding, the alternating current source connected through the gated amplifier to the primary winding of the step-up transformer, a rectifier connected in the secondary winding of the transformer rectifying the output thereof, the rectifier output connected in series with the high voltage supply to the photomultiplier tube, whereby the sensitivity of the photomultiplier tube is automatically controlled to effect a controlled video signal output responsive to variations in the background optical density of the scanned copy.

6. A facsimile transmitting system including automatic contrast control comprising a photomultiplier tube for generating video signals representative of the optical density of the copy, an output circuit for the photomultiplier tube including a pair of transistors connected in cascade as emitter followers providing a low impedance driver stage, a first diode rectifier coupled to said driver stage, a time constant circuit including a resistance and a capacitance connected in parallel and in series with the output of the diode to provide peak detection, a reference direct current power supply, an isolating resistor, a gated amplifier transistor having a base an emitter and a collector, the isolating resistor connected between the time constant circuit and the base of the gated amplifier transistor, a source of alternating driving potential connected to the base of the gated amplifier transistor, a step-up transformer having primary and secondary windings, the primary winding connected in the collector circuit of the gated amplifier transistor across the reference direct current power supply, a second diode rectifier connected in series with the secondary winding, a photomultiplier tube power supply connected in series with the output of the second rectifier and the photomultiplier tube, whereby the sensitivity of the photomultiplier tube is automatically controlled to effect a controlled video signal output responsive to variations in the background optical density of the scanned copy.

7. A facsimile transmitting system including automatic contrast control comprising a photomultiplier tube for generating video signals representative of the optical density of the copy, an output circuit for the photomultiplier tube including a pair of transistors connected in cascade as emitter followers providing a low impedance driver stage, a first diode rectifier coupled to said driver stage, a time constant circuit including a resistance and a capacitance connected in parallel and in series with the output of the diode to provide peak detection, a control transistor having a base, an emitter and a collector, the base of the control transistor supplied by the ouput of the peak detector circuit, an isolating resistor, a gated amplifier transistor having a base an emitter and a collector, the isolating resistor connected between the collector of the control transistor and the base of the gated amplifier transistor, a source of alternating driving potential connected to the base of the gated amplifier transistor, a reference direct current power supply, a step-up transformer having primary and secondary windings, the primary winding connected in the collector circuit of the gated amplifier transistor across the reference direct current power supply, a second diode rectifier connected in series with the secondary winding, a photo multiplier tube power supply connected in series with the output of the second rectifier and the photomultiplier tube, whereby the sensitivity of the photomultiplier tube is automatically controlled to effect a controlled video signal output responsive to variations in the background optical density of the scanned copy.

8. A facsimile transmitting system including automatic contrast control comprising a photomultiplier tube for generating video signals representative of the optical density of the copy, an output circuit for the photomultiplier tube including a pair of transistors connected in cascade as emitter followers providing a low impedance driver stage, a first diode rectifier coupled to said driver stage, a time constant circuit including a resistance and a capacitance connected in parallel and in series with the output of the diode to provide peak detection, a control transistor having a base, an emitter and a collector, the base of the control transistor supplied by the output of the peak detector circuit, a reference direct current power supply, an adjustable potentiometer connected in series with the reference power supply, the tap of the potentiometer connected to the emitter of the control transistor, a voltage divider connected across the reference power supply, a collector load resistor connected between the junction of the voltage divider and the collector of the control transistor providing collector gain, an isolating resistor, a gated amplifier transistor having a base an emitter and a collector, the isolating resistor connected between the collector of the control transistor and the base of the gated amplifier transistor, a source of alternating driving potential connected to the base of the gated amplifier transistor, a step-up transformer having primary and secondary windings, the primary winding connected in the collector circuit of the gated amplifier transistor across the reference direct current power supply, a second diode rectifier connected in series with the secondary winding, a photomultiplier tube power supply connected in series with the output of the second rectifier and the photomultiplier tube, whereby the sensitivity of the photomultiplier tube is automatically controlled to effect a controlled video signal output responsive to variations in the background optical density of the scanned copy.

9. A facsimile transmitting system including automatic contrast control comprising a photomultiplier tube for generating video signals representative of the optical density of the copy, an output circuit for the photomultiplier tube including a pair of transistors connected in cascade as emitter followers providing a low impedance driver stage, a first diode rectifier coupled to said driver stage, a time constant circuit including a resistance and a capacitance connected in parallel and in series with the output of the diode to provide peak detection, a control transistor having a base, an emitter and a collector, the base of the control transistor supplied by the output of the peak detector circuit, a reference direct current power supply, an adjustable potentiometer connected in series with the reference power supply, a first swamping resistor, the tap of the potentiometer connected to the emitter of the control transistor in series with the swamping resistor, a voltage divider connected across the reference power supply, a collector load resistor connected between the junction of the voltage divider and the collector of the control transistor providing collector gain, an isolating resistor, a gated amplifier transistor having a base an emitter and a collector, the isolating resistor connected between the collector of the control transistor and the base of the gated amplifier transistor, a source of alternating driving potential connected to the base of the gated amplifier transistor, a second swamping resistor connected between the emitter of the gated amplifier transistor and the reference power supply, a by-pass capacitor connected to the emitter of the gated amplifier transistor for increased gain, a step-up transformer having primary and secondary windings, the primary winding connected in the collector circuit of the gated amplifier transistor across the reference direct current power supply, a second diode rectifier connected in series with the secondary winding, a photomultiplier tube power supply connected in series with the output of the second rectifier and the photomultiplier tube, whereby the sensitivity of the photomultiplier tube is automatically controlled to effect a controlled video signal output responsive to variations in the background optical density of the scanned copy.

References Cited in the file of this patent

UNITED STATES PATENTS

| | | |
|---|---|---|
| 2,564,572 | Haynes | Aug. 14, 1951 |
| 2,645,724 | Rajchman et al. | July 14, 1953 |
| 2,943,208 | Shepard et al. | June 28, 1960 |
| 2,957,988 | Fearnside | Oct. 25, 1960 |